US006400442B1

(12) United States Patent
Johnson et al.

(10) Patent No.: US 6,400,442 B1
(45) Date of Patent: *Jun. 4, 2002

(54) OPTICAL SYSTEM FOR USE IN A PHOTOGRAPHIC PRINTER

(75) Inventors: Bruce K. Johnson, North Andover; Philip D. Chapnik, Newton, both of MA (US)

(73) Assignee: Polaroid Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/929,972

(22) Filed: Sep. 16, 1997

Related U.S. Application Data

(63) Continuation-in-part of application No. 08/703,985, filed on Aug. 28, 1996, now Pat. No. 5,864,390.

(51) Int. Cl.$^7$ .............................. G03B 27/24
(52) U.S. Cl. ................. 355/67; 347/256; 359/726
(58) Field of Search .................. 347/239, 241, 347/243, 244, 256, 258, 259; 355/67, 71; 359/741, 742, 599, 726

(56) References Cited

U.S. PATENT DOCUMENTS

| | | | | |
|---|---|---|---|---|
| 4,389,115 A | * | 6/1983 | Richter | 355/67 |
| 4,425,608 A | * | 1/1984 | Hecker et al. | 362/291 |
| 4,473,865 A | * | 9/1984 | Landa | 355/67 |
| 4,537,478 A | * | 8/1985 | Richter | 355/67 |
| 4,912,321 A | * | 3/1990 | Cooper | 359/217 |
| 5,093,745 A | * | 3/1992 | Kuroda | 359/217 |
| 5,159,352 A | * | 10/1992 | Feria et al. | 347/258 |
| 5,245,481 A | | 9/1993 | Kaneko et al. | 359/896 |
| 5,255,116 A | | 10/1993 | Araki et al. | 359/212 |
| 5,331,343 A | | 7/1994 | Ono et al. | 346/108 |
| 5,579,106 A | * | 11/1996 | Kremer | 356/528 |
| 5,615,198 A | | 3/1997 | Kubokawa | 369/102 |
| 5,627,689 A | | 5/1997 | Fujinawa et al. | 359/858 |
| 5,646,716 A | * | 7/1997 | Nagashima | 355/67 |
| 5,650,871 A | * | 7/1997 | Wilson | 359/216 |
| 5,864,388 A | * | 1/1999 | Shima et al. | 355/67 |
| 5,864,390 A | * | 1/1999 | Johnson et al. | 355/67 |
| 5,877,800 A | * | 3/1999 | Robinson et al. | 347/258 |

FOREIGN PATENT DOCUMENTS

| | | | |
|---|---|---|---|
| EP | 0 694 802 A2 | 1/1996 | ............ G02B/26/10 |
| EP | 0 703 088 A2 | 3/1996 | |
| WO | WO 92/10049 | 6/1992 | |

* cited by examiner

Primary Examiner—Alan A. Mathews

(57) ABSTRACT

An optical system is disclosed that minimizes drop-off problems associated with the process of imaging a small light source to a line. In one embodiment, a singly-curved primary mirror is used to maintain a substantially constant magnification factor of the optical system. In another embodiment, the small light source projects radiation through a cylindrical optical component that partially collimates the light, prior to the light impinging upon a doubly-curved primary mirror. Additional embodiments are shown that combine the cylindrical lens with a Schmidt plate, include an optional aperture stop, and include an optional spatial light modulator, as well as embodiments which vary the positioning of the elements in the optical system along the optical path.

23 Claims, 10 Drawing Sheets

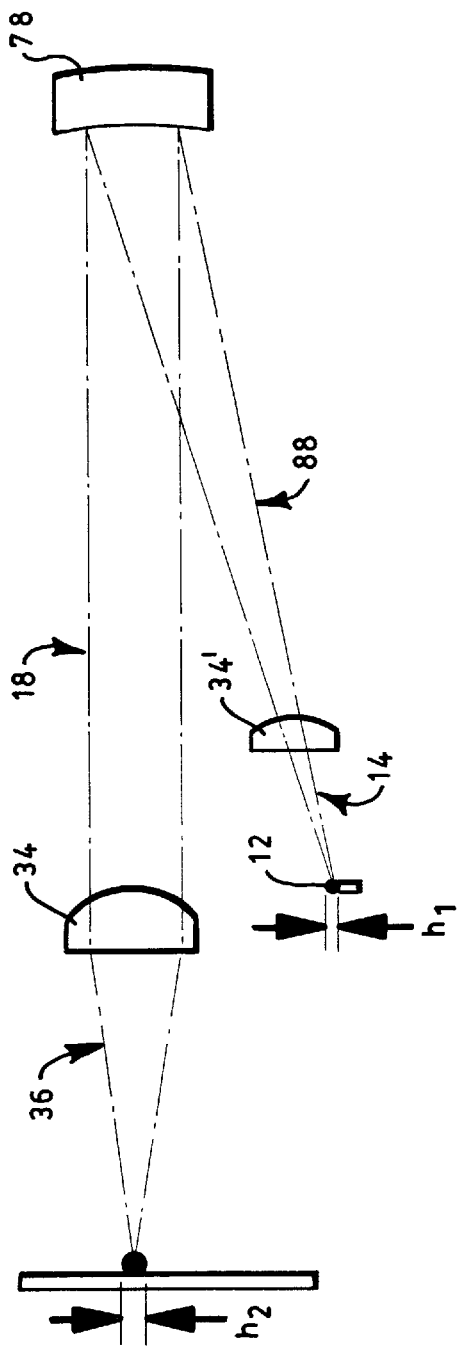
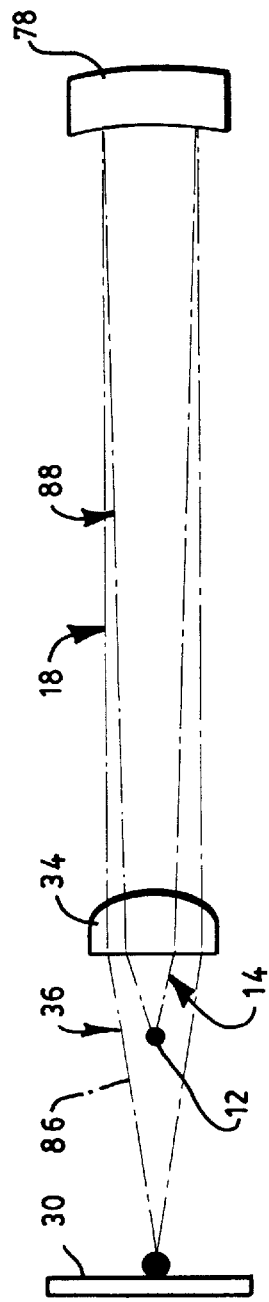
FIG. 7A
FIG. 7B

OPTICAL SYSTEM FOR USE IN A PHOTOGRAPHIC PRINTER

This application is a continuation-in-part of U.S. Ser. No. 08/703,985, filed Aug. 28, 1996 and issued as U.S. Pat. No. 5,864,390 on Jan. 26, 1999; the entire disclosures of which are hereby incorporated by reference herein.

BACKGROUND OF THE INVENTION

1. Field of the Invention

The present invention relates generally to optical systems for use in photographic printers and, more particularly, to scanning optical systems using radiation devices for use with photographic printers having spatial light modulators to modulate monochromatic light.

2. Description Of The Prior Art

There are numerous types of photographic printers available that range in cost and quality. One of the more common photographic printers uses an area cathode-ray tube (CRT) to image a photosensitive medium. In this printer, a CRT projects a two-dimensional image through a lens system onto the photosensitive medium. A problem with this printer is its size. The CRT itself is large. The lens system then directs the light through a focal cone that takes a large volume. Due to these factors, the printer becomes relatively large.

Another commercially available printer uses a linear CRT with red, green and blue (RGB) phosphor stripes and a fiber optic face plate to project an image onto the photosensitive medium as the photosensitive medium moves in a direction transverse to the linear CRT. While some of the size issues are addressed by this printer, the CRT is very expensive, making the printer very costly.

A third type of optical printer uses light emitting diodes (LEDs) and lenses to project image-bearing light to an oscillating mirror which directs the image-bearing light in a fast scan direction. Motion of the photosensitive medium relative to mirror is used for slow scan direction. This printer is compact but the optics are expensive.

Accordingly, it is an object of this invention to provide an optical system for a photographic printer that is compact.

It is another object of this invention to provide an optical system for a photographic printer that is inexpensive.

SUMMARY OF THE INVENTION

The present invention relates generally to optical systems suitable for use in the conversion between a line image of uniform height and an essentially localized, relatively small image, and in particular to line printing or scanning optical systems. The optical systems disclosed comprise a concave mirror, at least one cylindrical optical element, an optional aperture stop, and an optional spatial radiation modulator. In printing and other such illumination applications, the disclosed optical systems serves to produce a line image, of uniform height and intensity, from a radiation source of a relatively small size. For example, the optical systems can be adapted for use in photographic printers which print consecutive lines of pixels of an image onto a photosensitive medium.

The cylindrical optical element, which can be a cylindrical lens or a cylindrical mirror, is positioned in optical alignment with a substantially collimated beam of radiation produced by the concave mirror, and serves to converge or focus the substantially collimated radiation along at least one axis of the substantially collimated beam.

In one implementation the light is substantially collimated in one direction by the concave mirror which in this implementation is a cylindrical optical element, and as such has a singly-curved surface. In another implementation the light is substantially collimated in two directions by the concave mirror which has a doubly-curved surface, and a source optical element adapted to partially collimate the light prior to impinging upon the concave mirror, where the source optical element can be a separate element or combined with the cylindrical optical element. In either implementation the collimating means also minimizes drop-off of a height of the line image at the extremes.

A spatial radiation modulator may be disposed along the optical path of the optical system. The spatial radiation modulator may comprise a plurality of cells, each of which is electronically selectable between radiation-blocking and radiation-transmitting states. Each cell corresponds to a pixel which is thus selectable between the two states, to form an image on the photosensitive medium by selectively transmitting the incident focused radiation. Thus, when relative movement occurs between the photosensitive medium and the optical system, consecutive imaging lines are projected onto the photosensitive medium to create an image.

BRIEF DESCRIPTION OF THE DRAWINGS

The structure and operation of the invention, together with other objects and advantages thereof, may best be understood by reading the detailed description to follow in connection with the drawings in which:

FIG. 7A is a side five of a sixth embodiment of the invention; and

FIG. 7B is a side view of a seventh embodiment of the invention.

DESCRIPTION OF THE PREFERRED EMBODIMENTS

While the present invention retains utility within a wide variety of optical devices and may be embodied in several different forms, it is advantageously employed within an optical printer. Although this is the form of the preferred embodiment, and will be described as such, this embodiment should be considered as illustrative and not as restrictive. An example of another device in which the invention retains utility is an optical scanning system which reads light reflected from a subject to form an electronic image of the subject in a computer.

Description of the Preferred Embodiments

Figure 1:
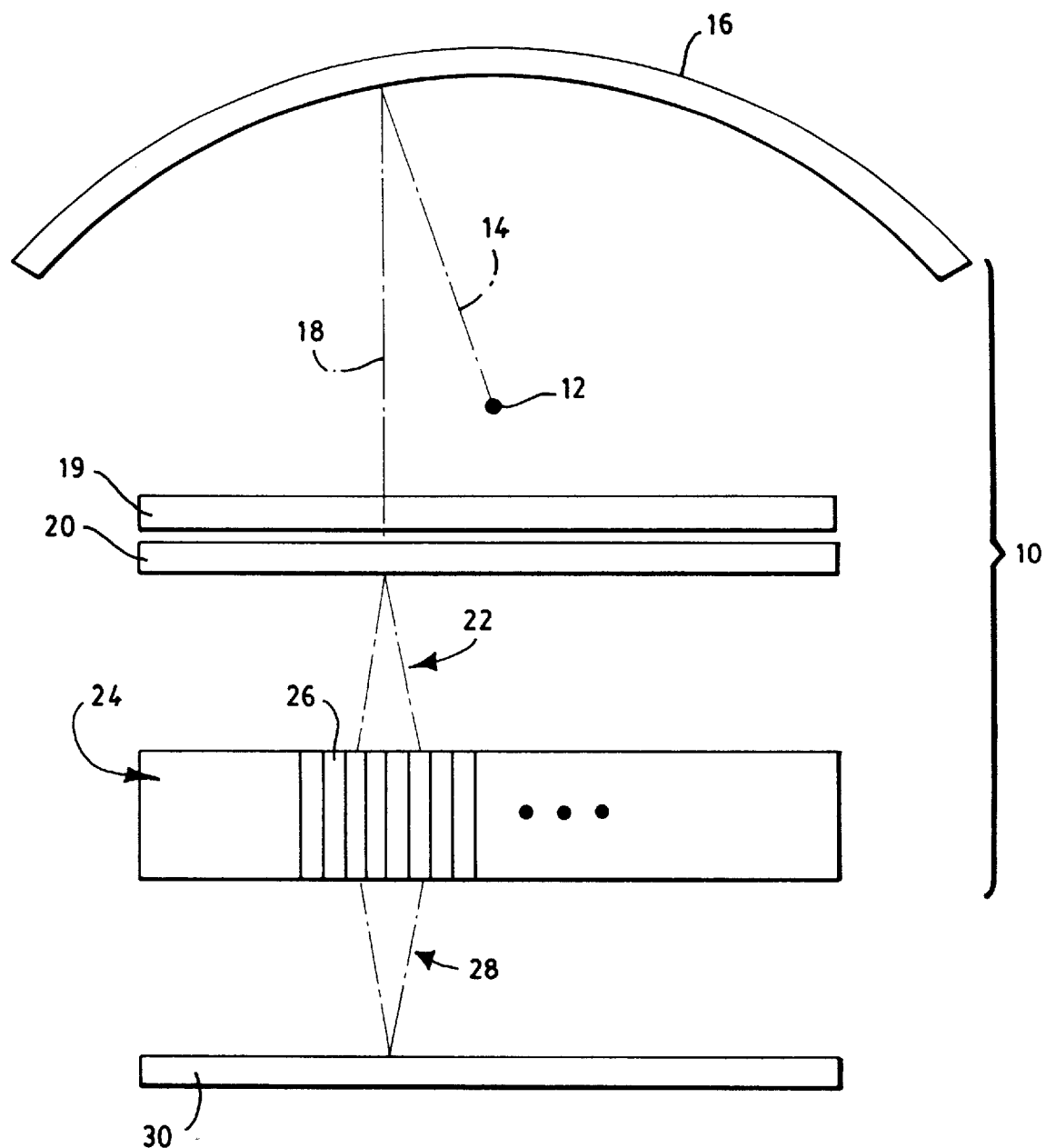
FIG. 1 is an overhead schematic view of a first embodiment of the invention.

Referring to FIG. 1, a first embodiment of the optical system 10 is shown. In this embodiment, a radiation source 12 projects light 14 towards an anamorphic mirror 16 which reflects the light. As the anamorphic mirror is curved in two directions, the reflected light 18 is substantially collimated in both directions at the spatial light modulator 20. The spatial light modulator 20 then serves to convert the reflected light 18 into image-bearing light 22. The image-bearing light 22 is transmitted via an optical conductor 24 and refocused as focused image-bearing light 28 onto a photosensitive medium 30.

The radiation source 12 can be any of various radiation devices. In a preferred embodiment, the radiation device includes LEDs and there is at least one LED for each of red, green, and blue. One skilled in the art will realize that the LED's of this embodiment and those which will be discussed hereinafter can be substituted with any of various other radiation devices that create colored light, such as standard white light sources that pass through color filter wheels. In the preferred embodiment, the light comprises optical radiation, such as infra-red, visible, or ultraviolet radiation, but use of the invention should not be considered as limited to optical radiation or these wavelengths.

The light 14 produced from the radiation source 12 is then projected onto the anamorphic mirror 16. This is substantially an equivalent of collimating the light. It also allows the transfer of light through air without additional lenses. The reflected light 18 is then substantially orthogonal to the photosensitive medium 30 as it passes through a diffuser sheet 19. The diffuser sheet 19 decollimates the reflected light 18 to increase light transmission uniformity of the system.

In another embodiment, a concave mirror can replace the anamorphic mirror 16, where a concave mirror as used herein has a surface with an arcuate, or conic cross section in one meridian plane, and an infinite radius of curvature in the orthogonal meridian plane, such as a cylindrical mirror. In the present specification, a cylindrical optical element is defined as an optical element comprising a lens surface or a mirror surface having a conic or an aspheric cross section in one meridian plane, and an infinite radius of curvature in the orthogonal meridian plane. As such, the reflected light 18 will be substantially collimated in one plane and diverging in the orthogonal plane. As depicted, the reflected light 18 is substantially collimated in the plane of the figure and diverging in the orthogonal plane. In this embodiment, some light loss may result from use of the concave mirror.

The reflected light 18 of either embodiment having been diffused by the diffuser sheet 19 then passes through the spatial light modulator 20. The spatial light modulator 20 is generally a series of cells disposed linearly across the photosensitive medium where each cell is filled with a liquid crystal. The liquid crystal is regularly arrayed in one or two dimensions and has birefringent optical properties such that an electric field placed across an individual cell transforms the cell between light blocking and light transmissive states. In one embodiment, the cells of the spatial light modulator are binary in that they are either transmissive or light blocking. Formation of gray levels on the photosensitive medium is achieved by using time delay modulation as is well known in the art. Alternatively, there can be used a spatial light modulator having multiple discrete gray levels, that is, a plurality of levels of light transmissiveness between light blocking and fully light transmissive states.

The reflected light 18 that emerges from the spatial light modulator 20 forms a divergent cone of light 22. Spatial light modulator 20 can be positioned at a greater distance from the photosensitive medium by placing an optical conductor 24 into the optical path between spatial light modulator 20 and photosensitive medium 30 as shown. In this first embodiment, the optical conductor is a series of gradient index rods 26, commonly known as grin rods. Grin rods 26 are optically conductive fibers such that light which enters the grinrods 26 emerges as focused image bearing light 28 which is essentially converged to a point on the photographic medium 30. One skilled in the art will understand that the light conductivity achieved using the grin rods can be obtained with other optical devices, such as a light pipe for example, though the grin rods contain desirable optical properties which are preferred.

While the optical system 10 described in FIG. I with the anamorphic mirror 16 is useful in many applications, there still exists an area for improvement of such an implementation. The light transmission efficiency is roughly ten to twenty percent of the available light due to the optical elements used in the design. This relatively low efficiency results from the loss of reflected light 18 which is not directed into spatial light modulator 20.

Figure 2A:
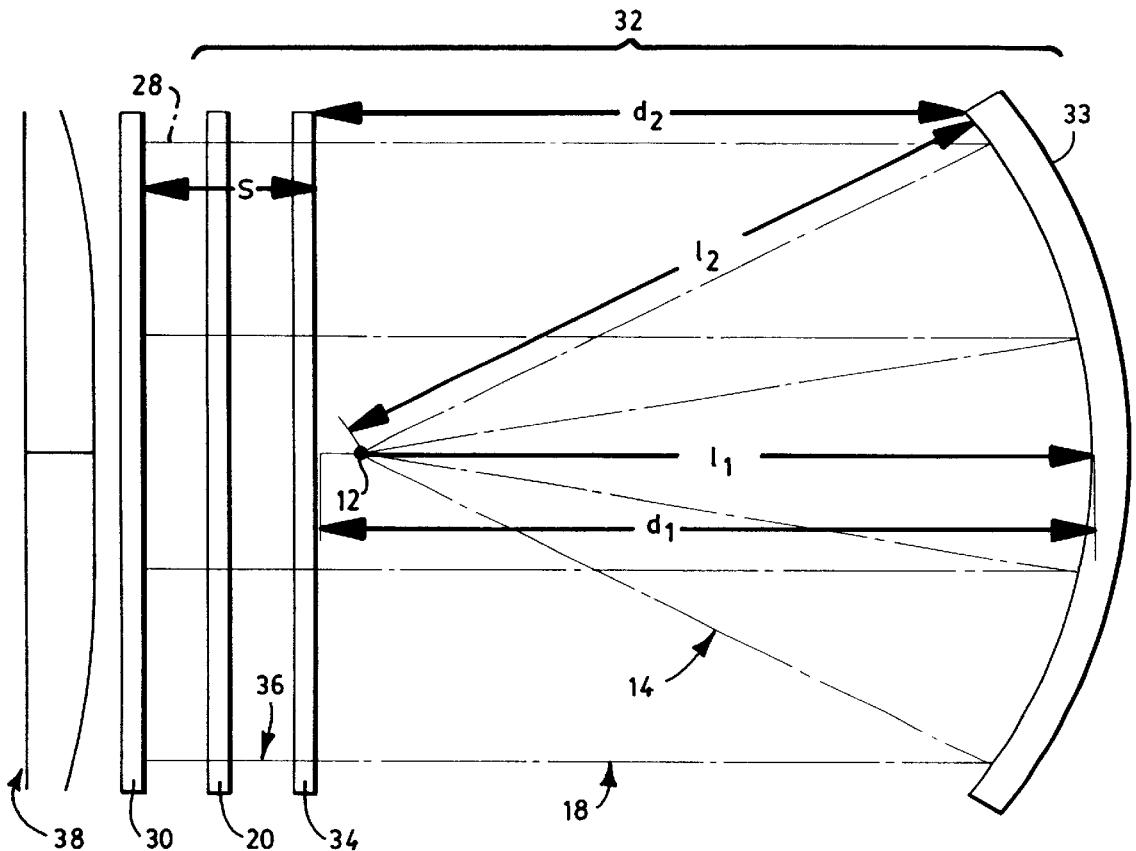
FIG. 2A is an overhead schematic view of a second embodiment of the invention.
Figure 2B:
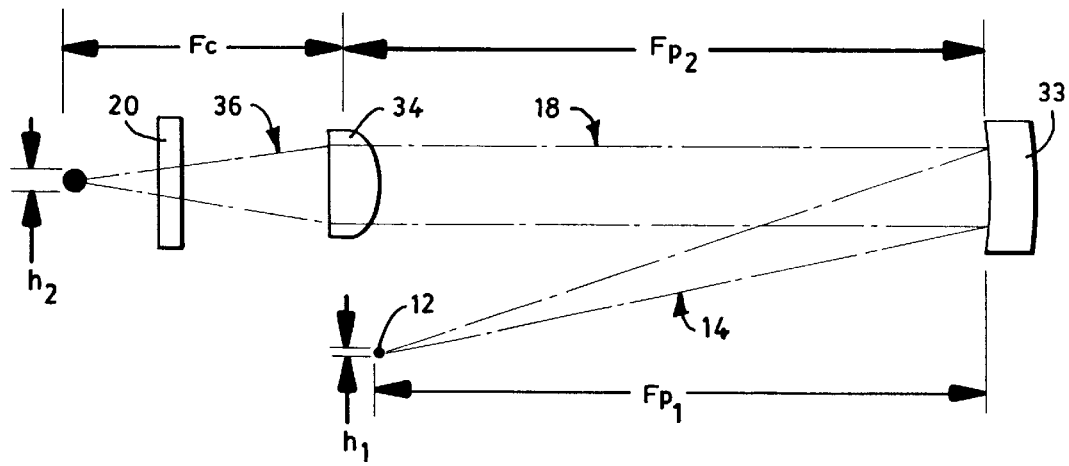
FIG. 2B is a side schematic view of the embodiment of the invention shown in FIG. 2A.

Referring now to FIGS. 2A and 2B where a second embodiment of the optical system 32 is shown, it can be seen that the path of the light 14 has a length $1_1$ along a central axis of the optical system 32, and has a second path length $1_2$ at a furthest edge of a parabolodial mirror 33. Hence the distance to the parabolodial mirror 33 along the parabola varies relative to the radiation source 12. Therefore, since the closest point on the parabola is along the central axis and the furthest point from the parabola is along the edge of the parabolodial mirror 33, the illumination drop-off of light 14 traveling along length $1_2$ is far greater than that light 14 that travels the distance $1_1$. This drop-off can be seen in the graph 38 of light irradiance at the photosensitive medium.

Also illustrated in this embodiment is how close proximity to the photosensitive medium can be avoided by using a cylindrical lens 34 between the paraboloidal mirror 33 and the spatial light modulator 20. In this way, the reflected light 18 is then made to converge such that the converging light 36 passes through the spatial light modulator 20 and forms a line on the photosensitive medium 30. A height of the line is then governed by the magnification factor M which is given by a focal length Fc, divided by a focal length Fp, such that M=(Fc/Fp), and, therefore, the height $h_1$ of the radiation source 12 is multiplied by the aforementioned magnification factor to determine the height $h_2$ of the line on the photosensitive medium 30, that is $$h_2 = h_1(Fc/Fp)$$

As the paraboloidal mirror 33 is a doubly-curved mirror resulting in substantially collimated light in the plane of FIG. 2A and the plane of FIG. 2B. The distance $d_1$ is greater than the distance $d_2$, and the distance of the light traveling along $1_1$ is less versus the light traveling along $1_2$. The formula above shows that the height $h_2$ of the line on the photosensitive medium 30 drops-off toward the edge of the photosensitive medium 30 because M is not substantially constant for a paraboloidal mirror. More particularly, $$h_2 = h_1(S/1)$$

In contrast, if the parabolodial mirror 33 is replaced with a parabolic cylindrical mirror, having as defined above, a curvature in one meridian and an infinite radius in the orthogonal meridian, the light would only be collimated in one direction, that of the plane of the FIG. 2A, and diverging in the plane of For this case, the magnification is given by $$h_2=h_1(S/(1+d))$$

Thus, the magnification factor M remains constant, as $1_1+d_1=1_2+d_2$. Thus, use of the cylindrical mirror will result in minimizing the line height drop-off of an imaged line height.

Figure 2C:
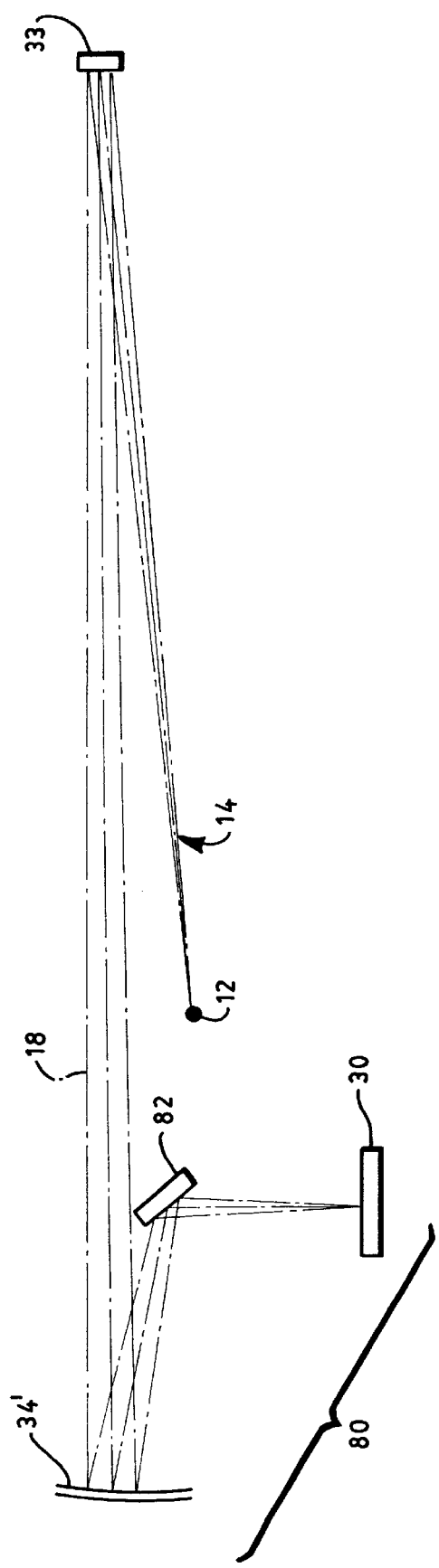
FIG. 2C is a side schematic view of the second embodiment of the invention where the cylindrical lens is replaced by a cylindrical mirror.

FIG. 2C shows another implementation of the present embodiment, the system uses a cylindrical mirror 34' instead of the cylindrical lens 34. The cylindrical mirror 34' will converge the reflected light 18 towards the photosensitive medium 30 in the direction of the plane of the figure and parallel to the direction of curvature of the cylindrical mirror 34'. Any of the embodiments, of the present invention can be practiced by replacing the cylindrical lens 34 with a cylindrical mirror 34', with a corresponding change in the direction of radiation. The system 80 also includes one or more fold mirrors 82. The fold mirrors 82 are commonly used in the art when the system would otherwise not have enough space to adequately focus the image.

Figure 3:
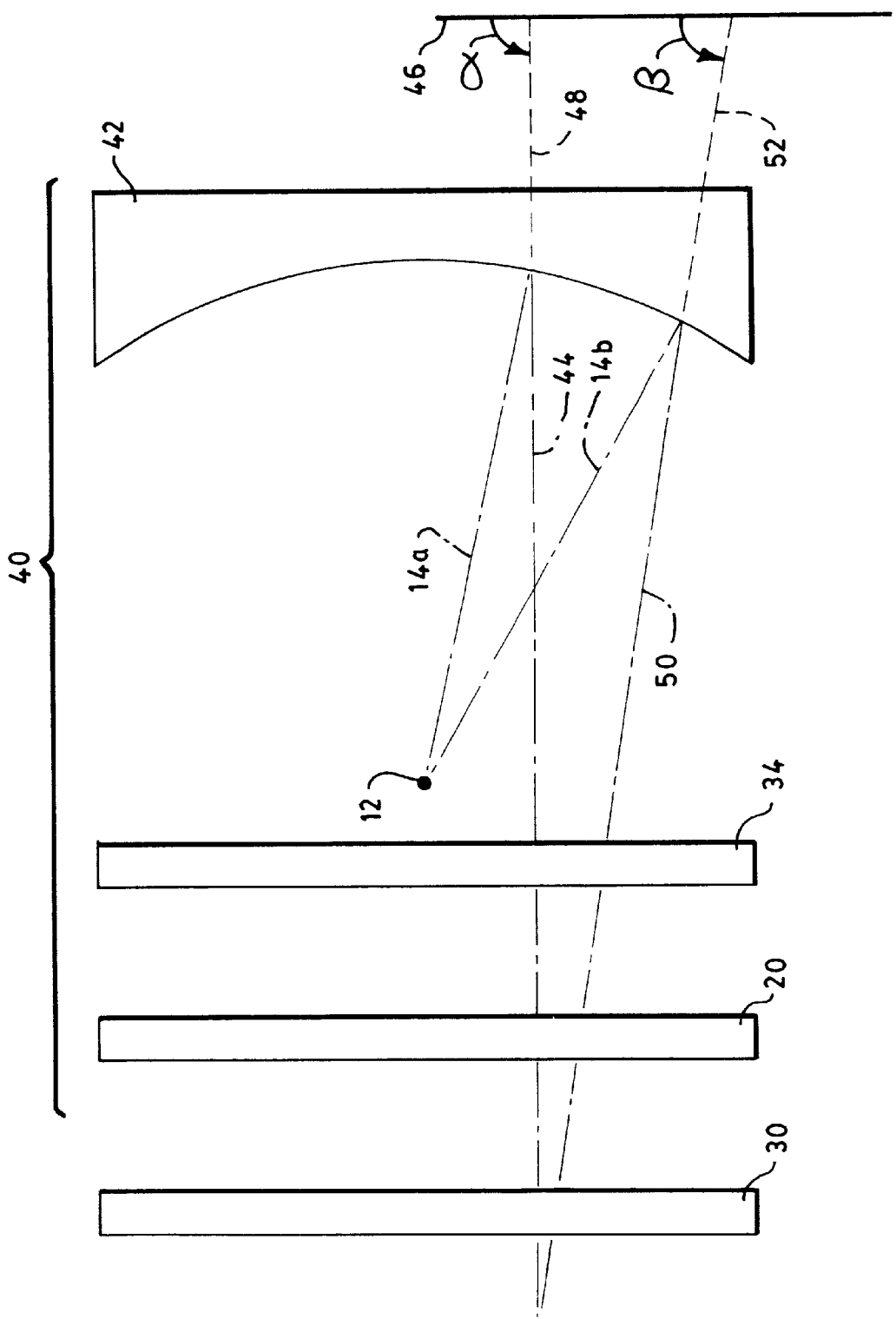
FIG. 3 is an overhead schematic view of the third embodiment of the invention.

The optical system shown in FIG. 3 reduces the previous problem of light drop-off with the paraboloidal mirror by substituting a spherical mirror 42 or a circular cylindrical mirror, having a constant radius in at least one meridian, for the paraboloidal mirror previously used. In this system though, the light from the radiation source 12 has an angle change dependent upon its point of reflection.

For example, a first ray 14a which reflects off of the spherical mirror as ray 44 is shown to have a reflected angle relative to the axis 46 of the spherical mirror 42 where the ray 44 is extended as dotted line 48 intersects the transverse axis with an angle α, which in the depicted example is substantially collimated. As the position of the light ray is moved along the spherical mirror 42, the angle with respect to the transverse axis 46 changes. Beam 14b reflects off the spherical mirror 42 as reflected beam 50, where reflected beam 50 is shown to intersect with the transverse axis 46 by a dotted line 52 at angle β which is converging. The angle with respect to the transverse axis is 90 degrees along the central axis of the optical system 40, which is substantially perpendicular to the transverse axis 46 and, therefore, reflects off of the spherical mirror 42 at an angle of ninety degrees. As the position of the light is displaced from the central axis, the angle of reflection with respect to the axis 46 then decreases such that β is slightly less than ninety degrees. Angle β is substantially less than ninety degrees, therefore the reflected light 44 passes through the cylindrical lens 34 and the spatial light modulator 20 to impinge upon the photosensitive medium 30 at a position slightly offset from an intended position. The beam 50 follows a similar path through the lens 34 and the spatial light modulator 20, but is substantially offset from an intended position due to the larger angle of reflection β.

Figure 4:
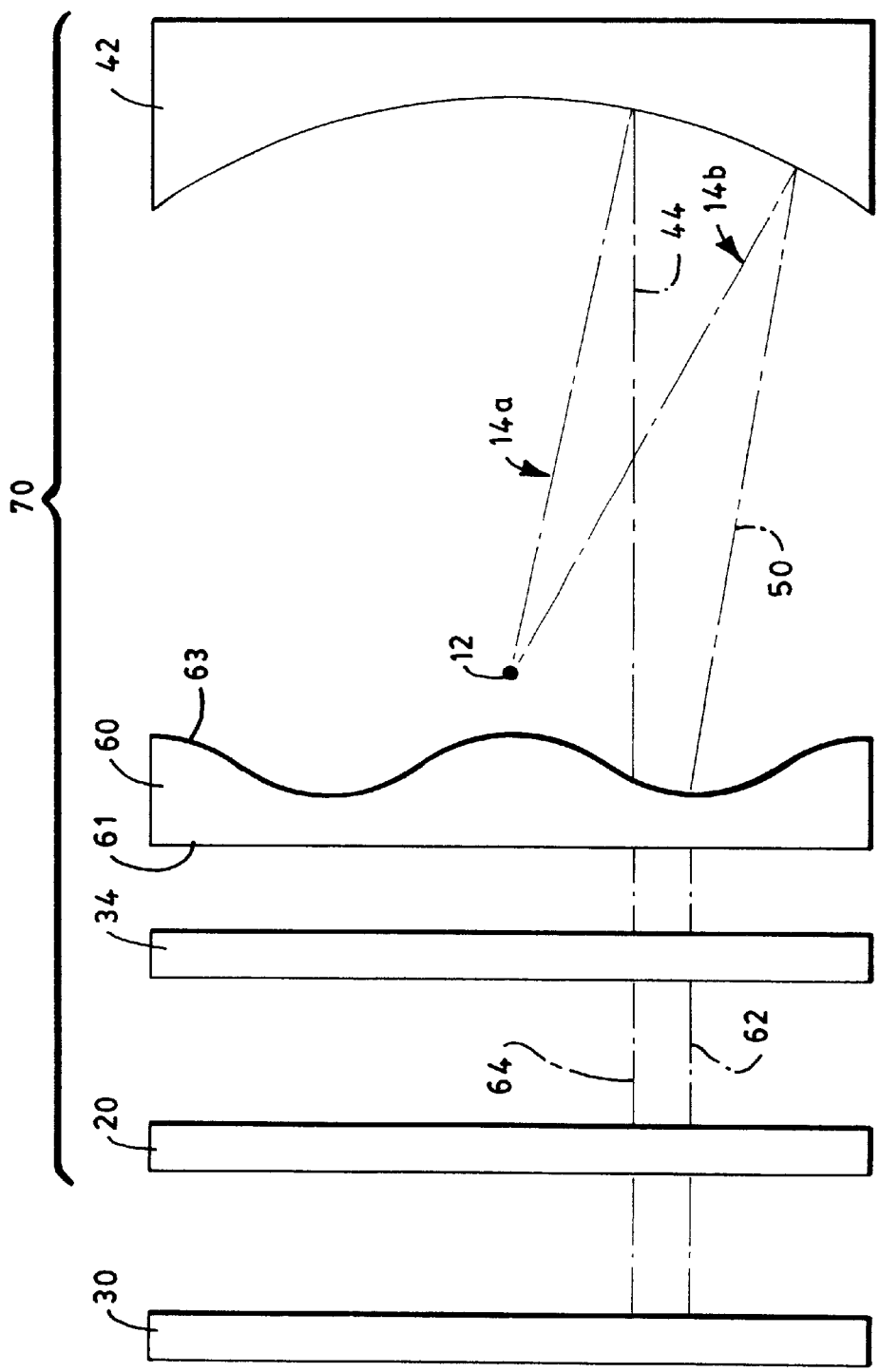
FIG. 4 is an overhead schematic view of the invention as shown in FIG. 3 including a Schmidt plate.

Referring now to FIG. 4, the radiation source 12 projects light in multiple beams as 14a and 14b which are reflected off the spherical mirror 42, or circular mirror, as reflected beams 44 and 50, respectively. In this optical system there is a Schmidt lens 60 through which the reflected beams 44, 50 pass before being converged by the cylindrical lens 34. The Schmidt lens 60 is a thin aspherical corrector plate placed in front of the spherical mirror 42. The corrector plate usually has one plane surface while the other is slightly convex around the center and slightly concave near its rim. Nominally, the Schmidt lens 60 is placed at the center of curvature of spherical mirror 42. In the present application, the Schmidt lens 60 can placed closer to spherical mirror 42, as shown, because the height of the light source 12 is a relatively small dimension, thus presenting a small field angle range to the Schmidt pate. Its purpose is to compensate for spherical aberration of the spherical mirror 42 and thereby redirect the optical path of incident light rays so as to substantially collimate the light. The compensation is most easily explained with reference to light energy. The Schmidt lens 60 is concentric about the same point as the spherical mirror 42 and the Schmidt lens 60 in combination with the spherical mirror 42 has minimal off-axis aberration. The aspherical geometry of the Schmidt lens 60 is designed such that reflected light converging off the spherical mirror 42 due to the aforementioned reflectance angle ax onto a spot on the Schmidt lens 60 collects substantially the same amount of light energy as a flat lens would collect from collimated light. Additionally, the Schmidt lens 60 serves to substantially collimate the light beyond that of the spherical mirror 42.

The reflected beams 44, 50 then emerge from the planar surface of the Schmidt lens 60 as substantially collimated beams 64, 62 respectively. The collimated beams 62, 64 pass through the cylindrical lens 34 which converges the light through the spatial light modulator 20 onto a line on the photosensitive medium 30 as previously described with minimal resulting aberrations.

It will be appreciated by one skilled in the relevant art that the present embodiment can also be practiced by replacing the refractive Schmidt lens with a reflective Schmidt mirror, with a corresponding change in the direction of radiation.

The efficiency of embodiment as compared that of the first embodiment shown in FIG. 1, is considerably greater. Due to the light focusing performed prior to light entry into the spatial light modulator 20, the efficiency is five to ten times that of the first embodiment. Also, the circular cylindrical mirror exhibits a substantially constant magnification factor as Fp is substantially constant across the output of the circular cylindrical mirror, thus, a circular cylindrical mirror in FIG. 3 generates a substantially constant line height at the photosensitive medium across the width of the line. The parabolic cylindrical mirror of FIG. 2A, however, is superior to the circular cylindrical mirror in this aspect as the magnification factor of the radiation device including the parabolic mirror is more constant than the radiation device with the circular cylindrical mirror.

Figure 5A:
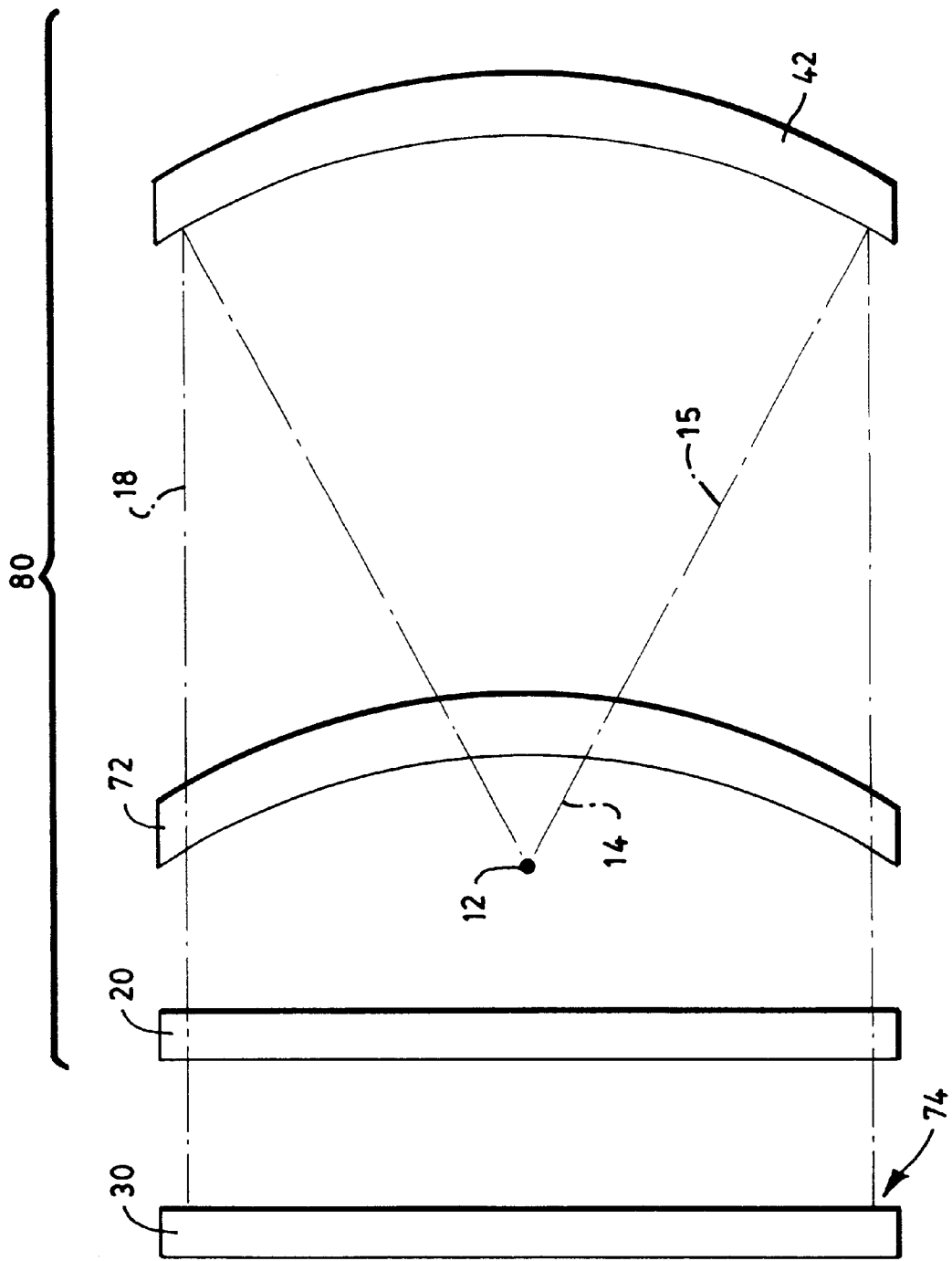
FIG. 5A is a side view of a fourth embodiment of the invention.

FIG. 5A illustrates an additional dilemma encountered when using LED's 12. In the figure, a LED 12 is shown projecting light off of the spherical mirror 42, which is a doubly-curved mirror, or the cylindrical mirror as previously described. In this figure, the Schmidt lens is removed in an attempt to remove optical elements and simplify the design. In order to compensate for the spherical aberrations caused by the spherical mirror 42 that had been previously handled by the Schmidt lens, the cylindrical lens is bent to form a curved shape, the shape can be toroidal or arcuate, for example, that the ray on the photosensitive medium 30 is focused, along its entire length, thereby compensating for field curvature.

Figure 5B:
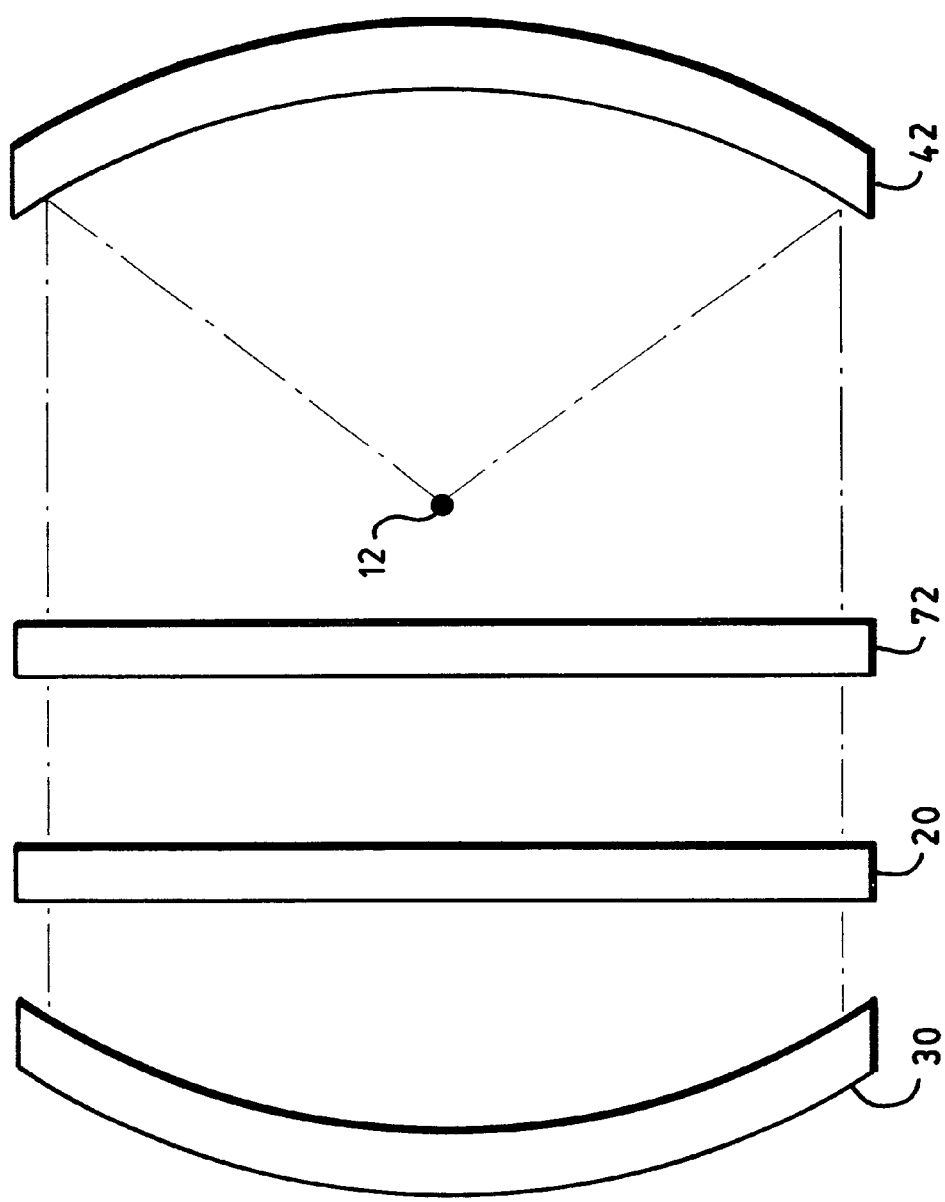
FIG. 5B is an overhead view of schematic view of an implementation of the fourth embodiment having a curved imaging plane.

FIG. 5B illustrates another embodiment where the photosensitive medium 30' is bent to compensate for the focusing of the line image instead of bending the cylindrical lens 72 as was shown in FIG. 5A. It should be apparent that the photosensitive medium can be any medium, such as film, a charge coupled device, a charge injected device, or paper for example.

A more uniform irradiance can be imaged from the optical system when the photosensitive medium 30' is positioned at the center of curvature of a primary mirror of the optical system, where the primary mirror can be the doubly-curved spherical mirror 42 (as depicted) or the circular cylindrical mirror (not shown). For the doubly curved spherical mirror, a more uniform irradiance is achieved when any Lambertian light source is placed at the focal point of the primary mirror. When the primary mirror is a cylindrical mirror, the photosensitive medium 30 can also be positioned at the center of curvature of the cylindrical mirror to produce a more uniform irradiance.

When the spatial light modulator 20 is positioned at the center of curvature of the primary mirror, an aberration called coma, an optical aberration well known in the art is reduced, owing to the embodiments independence of aperture size and angle to position along the radius of the spatial light modulator 20. In this implementation, however, the spatial light modulator 20 would not be bent, and only the center of the spatial light modulator 20 would be positioned substantially at the center of curvature of the primary mirror. Except when placing the spatial light modulator at the center of curvature of the primary mirror, the inclusion of the spatial light modulator is optional in the embodiments of this invention. A center of the film plane can also be positioned substantially at the center of the primary mirror without being bent as the height of the radiation source is relatively small to produce the more uniform irradiance as was earlier described.

Figure 6A:
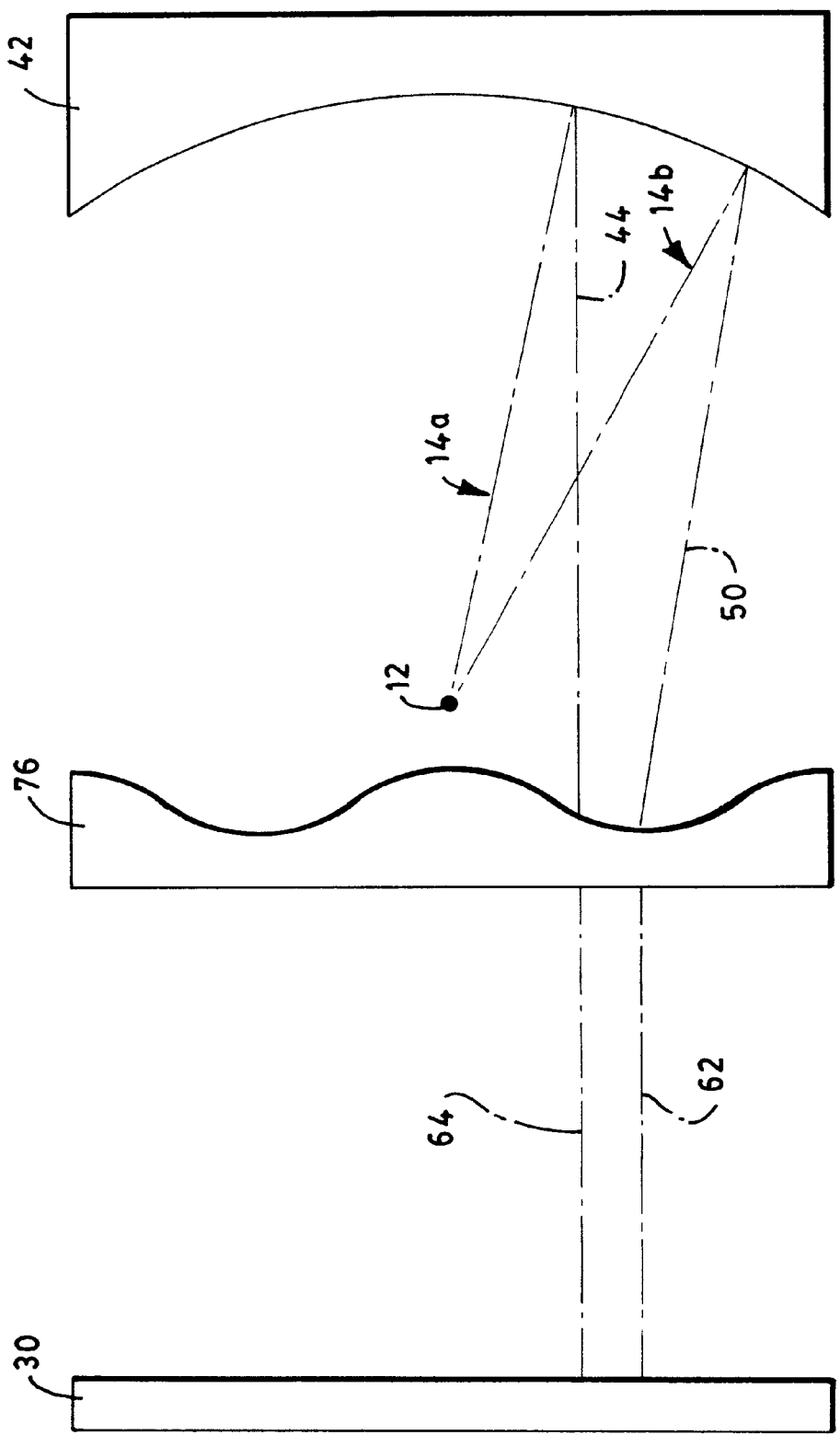
FIG. 6A is an overhead schematic view of a fifth embodiment of the invention.
Figure 6B:
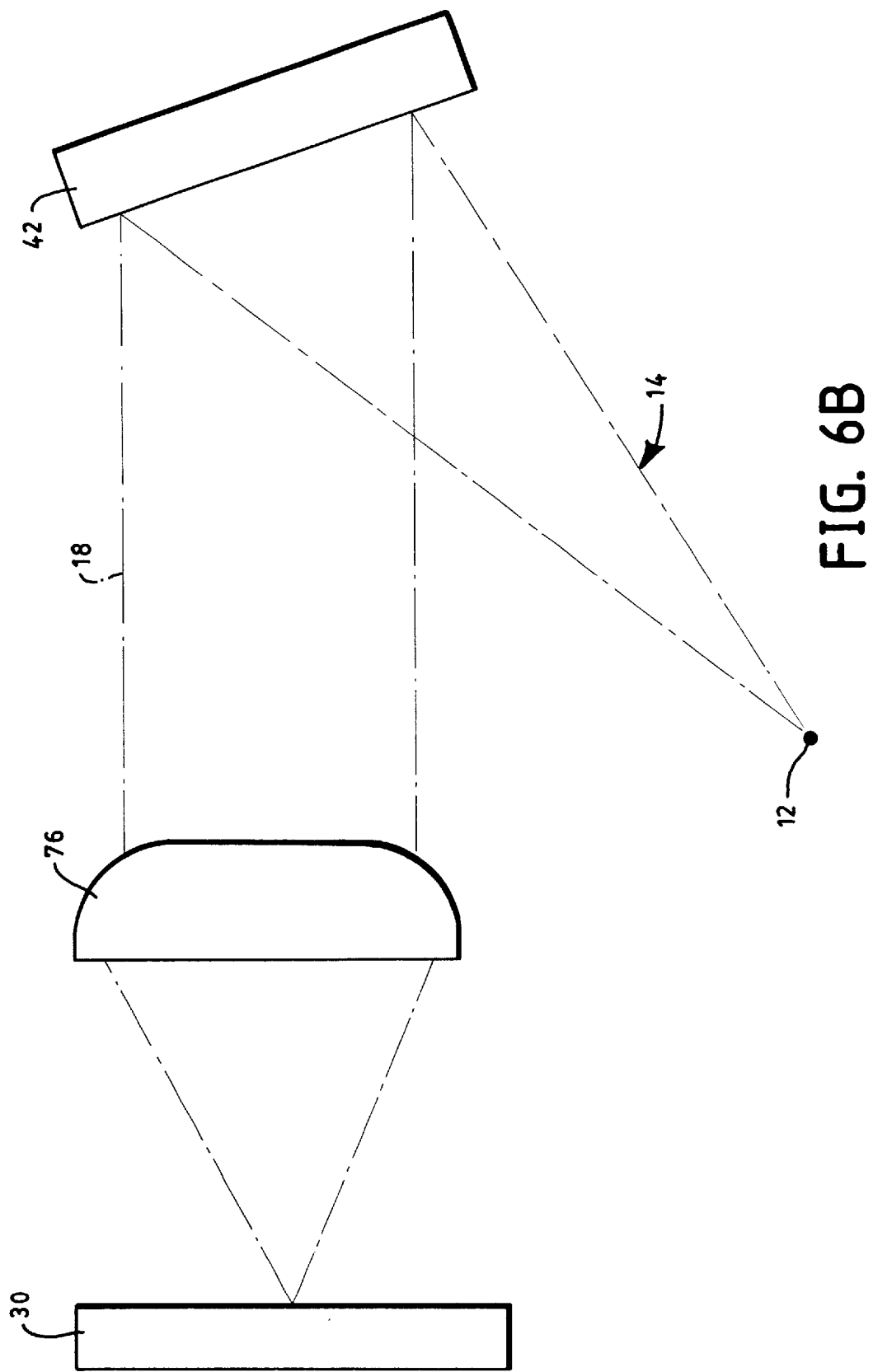
FIG. 6B is a side view of the invention as is shown in FIG. 6A.

In another embodiment, shown in FIGS. 6A and 6B, where like numerals designate like elements, the Schmidt lens is not removed but modified to form in combination with the cylindrical lens a complex lens 76 that performs the functions of both the elements. A side of the complex lens 76 facing the reflected light 18 has the form of a corrector plate and the side facing the image has the form of the cylindrical lens. The complex lens 76 can be doubly-curved, having a corrector plate that is rotationally symmetric. The complex lens 76 can also be cylindrical, as depicted. If any slight aberrations result from use of the primary mirror, the aberrations can be minimized by bending the complex lens 76 as described with reference to FIGS. 5A and 5B.

Additionally, in FIGS. 6A and 6B, the embodiments can be practiced by replacing the complex lens 76 with a complex mirror, with a corresponding change in the direction of radiation. The complex mirror, however, functions better when this implementation uses a cylindrical primary mirror as opposed to the doubly-curved primary mirror (not shown).

The previous embodiments have illustrated, in part, that use of a cylindrical primary mirror as opposed to a doubly-curved primary mirror, reduce the line height drop-off across a length of a line at the photosensitive medium. The doubly-curved primary mirrors of these embodiments due to their varying focal length still produce an image that exhibits line height drop-off. The radiation device shown in FIG. 7A reduces the line height drop-off problem for systems The cylindrical source lens 34' serves to modify the imaging radiation formed at the focal plane at photosensitive medium 30 by assuring that the line image thus formed is uniformly magnified across the irradiated straight section of photosensitive medium 30. The optical system, will substantially maintain the height ($h_2$) of image line at a constant size. This constant height is maintained by the process of first converting radiation 14 into partially-collimated radiation 88, by means of the source cylindrical lens 34', where partially-collimated radiation 88 is reflected by the doubly-curved mirror 78.

The degree of partial-collimated is dependent upon an output angle as seen by the doubly-curved mirror 78. As seen from the doubly-curved mirror 78, the radiation impinging upon the center of the doubly-curved mirror 78 is partially collimated to a degree such that the effective height $h_1$ of the radiation 12 source is $h_{center}$. As seen form the doubly-curved mirror 78, the radiation impinging away from the center of the doubly-curved mirror 78 is partial collimated to a degree such that the effective height $h_1$ of the radiation source is $h_{edge}$, where $h_{edge}$ is larger than $h_{center}$. Thus, the cylindrical source lens 34' produces partially-collimated radiation 88 that varies along the doubly-curved mirror 78 as seen by the doubly-curved mirror in the plane of the Figure, such that the radiation impinging away from the center of the doubly-curved mirror 88 will have a magnification factor similar to the radiation impinging at the center of the doubly curved mirror 88. As such, $h_2$ on the medium will not substantially vary across the medium, whether the radiation that is imaged if from the radiation impinging upon the center verses the edges of the doubly-curved mirror 78.

FIG. 7B shows an optical system wherein the source cylindrical lens 34' and the focusing cylindrical lens 34 of FIG. 7A are combined in one optical element that performs both functions. It should be appreciated that the cylindrical lens of any of the embodiments can be any multi-element optical component, such as an achromatic lens, for example.

Both optical systems may further comprise an aperture stop 86 (shown only in FIG. 7B, for clarity) disposed between cylindrical lens 34 and photosensitive medium 30. Aperture stop 86 serves to define the convergence angle of radiation forming image line. As can be appreciated by one skilled in the relevant art, aperture stop 86 can be otherwise placed along the optical path of optical systems.

Any of the above-disclosed optical systems can be adapted for use in the detection section of a scanning device by replacing radiation source 12 with a detector device, and replacing the objective surface with an illuminated surface to be scanned. In scanner applications, the radiation propagates in a direction opposite to that present in a printing or illumination application.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical system suitable for producing a uniform line of light upon a medium, the optical system comprising:

a radiation source that projects light;

a reflective collimating means in optical alignment with the radiation source adapted to create a substantially collimated beam of light reflected in at least one direction, wherein said reflective collimating means is an aspheric mirror curved in at least one direction adapted to reflect the beam of light impinging thereupon such that the divergence of the beam is minimized thus creating the substantially collimated beam; and a reflective optical component in optical alignment with the substantially collimated beam of light transmitted from the collimating means where the optical component is adapted to cause the substantially collimated beam to converge along only one axis of the substantially collimated beam, so as to project the uniform line of light on the medium.

2. An optical system according to claim 1 wherein the beam of light is substantially collimated in one direction coincident with a length of the line, thereby minimizing the line height drop off at extremes of the medium.

3. An optical system according to claim 1 wherein the beam of light is substantially collimated in a direction parallel to a length of the line.

4. An optical system according to claim 1 wherein the reflective collimating means is a doubly-curved mirror.

5. An optical system according to claim 3 wherein the reflective optical component is a cylindrical mirror.

6. An optical system according to claim 1 wherein the reflective collimating means is an arcuate mirror, curved in at least one direction so as to reflect the beam of light such that the divergence of the beam is minimized thus creating the substantially collimated beam.

7. An optical system according to claim 1 wherein the radiation source is at least one light emitting diode.

8. An optical system suitable for producing an uniform line of light upon a medium, the optical system comprising:
   a radiation source that projects light;
   a reflective collimating means in optical alignment with the radiation source adapted to create a substantially collimated beam of light reflected in at least one direction; and
   an optical component in optical alignment with the substantially collimated beam of light transmitted from the collimating means where the optical component is adapted to cause the substantially collimated beam to converge along only one axis of the substantially collimated beam, so as to project the uniform line of light on the medium, and
   wherein the reflective collimating means has a center of curvature, and the optical system further comprises:
      a spatial light modulator disposed in the optical path of the projected beam of light from the optical component, wherein the spatial light modulator is positioned at the center of curvature of the reflective collimating means, thus decreasing the presence of optical aberrations.

9. An optical system suitable for producing an uniform line of light upon a medium, the optical system comprising:
   a radiation source that projects light;
   a reflective collimating means in optical alignment with the radiation source adapted to create a substantially collimated beam of light reflected in at least one direction; and
   an optical component in optical alignment with the substantially collimated beam of light transmitted from the collimating means where the optical component is adapted to cause the substantially collimated beam to converge along only one axis of the substantially collimated beam, so as to project the uniform line of light on the medium, and
   wherein the reflective collimating means is a curved mirror curved in at least one direction, and wherein the optical component has a Schmidt-type surface in at least one direction and has a cylindrical surface in another direction.

10. An optical system according to claim 9 wherein the Schmidt plate and the optical component are one piece.

11. An optical system according to claim 9 wherein the Schmidt plate is reflective.

12. An optical system according to claim 9 wherein the Schmidt plate is refractive.

13. An optical system suitable for producing an uniform line of light upon a medium, the optical system comprising:
   a radiation source that projects light;
   a reflective collimating means in optical alignment with the radiation source adapted to create a substantially collimated beam of light reflected in at least one direction, wherein the reflective collimating means is a spherical mirror; and
   an optical component in optical alignment with the substantially collimated beam of light transmitted from the collimating means where the optical component is adapted to cause the substantially collimated beam to converge along only one axis of the substantially collimated beam, so as to project the uniform line of light on the medium, and
   wherein the optical component has a bent or curved shape so as to compensate for its field of curvature whereby the uniform line of light is focused along the entire length of the medium.

14. An optical system suitable for producing an uniform line of light upon a medium, the optical system comprising:
   a radiation source that projects light;
   a reflective collimating means in optical alignment with the radiation source adapted to create a substantially collimated beam of light reflected in at least one direction, wherein the reflective collimating means is a spherical mirror; and
   an optical component in optical alignment with the substantially collimated beam of light transmitted from the collimating means where the optical component is adapted to cause the substantially collimated beam to converge along only one axis of the substantially collimated beam, so as to project the uniform line of light on the medium, and
   wherein said system is suitable for use with a bent medium, wherein the uniform line of light projected on the medium has a best focused surface that is curved to coincide with the bent medium.

15. An optical system suitable for producing an uniform line of light upon a medium, the optical system comprising:
   a radiation source that projects light;
   a reflective collimating means in optical alignment with the radiation source adapted to create a substantially collimated beam of light reflected in at least one direction, wherein the reflective collimating means is a spherical mirror;
   an optical component in optical alignment with the substantially collimated beam of light transmitted from the collimating means where the optical component is adapted to cause the substantially collimated beam to converge along only one axis of the substantially collimated beam, so as to project the uniform line of light on the medium; and
   a source optical component disposed between the radiation source and the reflective collimating means, the radiation source and the source optical component in optical alignment therewith, the source optical component is further adapted to partially collimate the beam of light and transmit a partially collimated beam of light towards the reflective collimating means.

16. An optical system according to claim 15 wherein the optical component is a cylindrical mirror.

17. An optical system according to claim 15 wherein the optical component has a bent or curved shape so as to compensate for its field of curvature whereby the uniform line of light is focused along the entire length of the medium.

18. An optical system according to claim 15 suitable for use with a bent medium, wherein the uniform line of light projected on the medium has a best focused surface that is curved to coincide with the bent medium.

19. An optical system suitable for producing an uniform line of light upon a medium, the optical system comprising:

a radiation source that projects light;

a reflective collimating means in optical alignment with the radiation source adapted to create a substantially collimated beam of light reflected in at least one direction, wherein the reflective collimating means is a spherical mirror; and an optical component in optical alignment with the substantially collimated beam of light transmitted from the collimating means where the optical component is adapted to cause the substantially collimated beam to converge along only one axis of the substantially collimated beam, so as to project the uniform line of light on the medium, and wherein the optical component is in optical alignment with the radiation source and the reflective collimating means, the optical component transforming the light from the radiation source into a partially collimated beam of light and transmitting the partially collimating the beam of light to the reflective collimating means prior to the optical component converging the substantially collimated beam of light produced from the reflective collimating means.

20. An optical system according to claim 19 wherein the optical component has a bent or curved shape so as to compensate for its field of curvature whereby the uniform line of light is focused along the entire length of the medium.

21. An optical system according to claim 19 suitable for use with a bent medium, wherein the uniform line of light projected on the medium has a best focused surface that is curved to coincide with the bent medium.

22. An optical system suitable for producing an uniform line of light upon a medium, the optical system comprising:

a radiation source that projects light;

a reflective collimating means in optical alignment with the radiation source adapted to create a substantially collimated beam of light reflected in at least one direction, wherein the reflective collimating means is a spherical mirror;

an optical component in optical alignment with the substantially collimated beam of light transmitted from the collimating means where the optical component is adapted to cause the substantially collimated beam to converge along only one axis of the substantially collimated beam, so as to project the uniform line of light on the medium; and a Schmidt plate wherein the Schmidt plate having a Schmidt-type surface is disposed in optical alignment between the reflective collimating means and the optical component.

23. An optical system suitable for producing an uniform line of light upon a medium, the optical system comprising:

a radiation source that projects light;

a reflective collimating means in optical alignment with the radiation source adapted to create a substantially collimated beam of light reflected in at least one direction, wherein the reflective collimating means is a spherical mirror; and an optical component in optical alignment with the substantially collimated beam of light transmitted from the collimating means where the optical component is adapted to cause the substantially collimated beam to converge along only one axis of the substantially collimated beam, so as to project the uniform line of light on the medium, and wherein the reflective collimating means is a curved mirror curved in at least one direction, and wherein the optical component has a Schmidt-type surface in at least one direction and has a cylindrical surface in another direction.

* * * * *